United States Patent
Yoshino et al.

(10) Patent No.: US 10,427,746 B2
(45) Date of Patent: Oct. 1, 2019

(54) AUTOMATIC TILTING VEHICLE

(71) Applicant: TOYOTA JIDOSHA KABUSHIKI KAISHA, Toyota-shi, Aichi (JP)

(72) Inventors: Hayato Yoshino, Susono (JP); Takahito Ishino, Susono (JP); Koichi Nishimura, Gotemba (JP); Yoshikazu Kameda, Gotemba (JP); Mitsuyuki Ohuchi, Mishima (JP); Osamu Yasuike, Numazu (JP); Hirotaka Kamano, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 88 days.

(21) Appl. No.: 15/810,812

(22) Filed: Nov. 13, 2017

(65) Prior Publication Data
US 2018/0134336 A1 May 17, 2018

(30) Foreign Application Priority Data

Nov. 14, 2016 (JP) .................... 2016-221171

(51) Int. Cl.
| B62K 11/00 | (2006.01) |
| B62D 9/02 | (2006.01) |
| B62K 5/05 | (2013.01) |
| B62K 5/08 | (2006.01) |
| B62K 5/10 | (2013.01) |

(52) U.S. Cl.
CPC ............ B62K 11/007 (2016.11); B62D 9/02 (2013.01); B62K 5/05 (2013.01); B62K 5/08 (2013.01); B62K 5/10 (2013.01); B62K 2207/02 (2013.01); B62K 2207/04 (2013.01)

(58) Field of Classification Search
CPC .......... B62K 11/007; B62K 5/05; B62K 5/10; B62K 5/08; B62K 2207/02; B62K 2207/04; B62D 9/02
See application file for complete search history.

(56) References Cited

U.S. PATENT DOCUMENTS

2006/0095181 A1* 5/2006 Darvish .............. B60R 21/0132
701/38
2010/0114420 A1* 5/2010 Doi ...................... B60N 2/0244
701/31.4
2018/0265157 A1* 9/2018 Hara ...................... B62K 25/08

FOREIGN PATENT DOCUMENTS

| JP | 2011-230651 A | 11/2011 |
| JP | 2012-081784 A | 4/2012 |
| JP | 2013-244763 A | 12/2013 |

* cited by examiner

Primary Examiner — Darlene P Condra
(74) Attorney, Agent, or Firm — Oliff PLC

(57) ABSTRACT

An automatic tilting vehicle includes left and right wheels rotatably supported by carriers, a vehicle tilting device, and a control unit. The vehicle tilting device includes a swing member swinging about a swing axis, an actuator that swings the swing member, a pair of tie rods pivotally connected to the swing member and the carriers. The control unit controls the actuator so that the tilt angle of the vehicle conforms to a target tilt angle and determines that the vehicle tilting device is abnormal when a relationship between the swing angular velocity of the swing member and the tilt angular velocity of the vehicle deviates from an allowable range.

4 Claims, 7 Drawing Sheets

AUTOMATIC TILTING VEHICLE

CROSS-REFERENCE TO RELATED APPLICATION

The disclosure of Japanese Patent Application NO. JP2016-221171 filed on Nov. 14, 2016 is incorporated by reference in its entirety.

BACKGROUND

1. Technical Field

The present disclosure relates to an automatic tilting vehicle that automatically tilts (self inclines) to the inside of a turn when turning.

2. Description of the Related Art

The automatic tilting vehicle has a vehicle tilting device, and the vehicle is automatically tilted to the inner side of a turn by the vehicle tilting device at the time of turning. For example, Japanese Patent Application Laid-Open Publication No. 2013-244763 describes an automatic tilting vehicle that includes a pair of laterally spaced wheels, a swing type vehicle tilting device, and a control unit that controls the vehicle tilting device, and the pair of wheels are rotatably supported by corresponding carriers. The vehicle tilting device includes a swing member swingable about a swing axis extending in a longitudinal direction of the vehicle, an actuator that swings the swing member about the swing axis, and a pair of tie rods pivotally attached to the swing member and the corresponding carriers.

When the swing member swings about the swing axis, the pair of tie rods vertically move in mutually opposite directions, so that the right and left wheels move up and down in opposite directions with respect to a vehicle body, whereby the vehicle inclines in the lateral direction. The control unit calculates a target tilt angle θt of the vehicle for stably running the vehicle based on a steering operation amount of a driver and a vehicle speed and controls a swing angle of the swing member by the actuator so as to tilt the vehicle so that a tilt angle θ of the vehicle conforms to the target tilt angle θt.

According to the swing type vehicle tilting device, by pivoting the swing member about the swing axis by the actuator, the pair of tie rods are vertically moved in mutually opposite directions, and the left and right wheels are moved in mutually opposite directions with respect to the vehicle body. Therefore, as compared to where an actuator is provided for each of the left and right wheels, and each wheel is vertically moved in opposite directions with respect to the vehicle body by the corresponding actuator, the structure of an automatic tilting vehicle can be simplified, which enables to simplify the tilt control of the vehicle.

In the swing type vehicle tilting device, however, when one wheel receives a push-up load from a road surface upward, the load is transmitted to the swing member via one tie rod, and is further transmitted to the other wheel through the other tie rod. Therefore, when a high push-up load acts on one wheel as in a case of getting on a curbstone, bending deformation of the one tie rod may occur due to buckling. In particular, this problem is noticeable when a suspension spring is not provided between the swing member and the wheels, but is provided between an actuator and a vehicle body.

Since a swing angle of the swing member is controlled by the actuator so that a tilt angle θ of the vehicle conforms to the target tilt angle θt even if one or both of the tie rods undergo bending deformation, the tilt angle θ of the vehicle is controlled so as to be the tilt angle θt. Therefore, a running condition of the vehicle is not influenced by the bending deformation of a tie rod. Consequently, even if a tie rod is bent and the vehicle tilting device becomes abnormal, a driver cannot recognize this situation.

Note that Japanese Patent Application Laid-Open Publication No. 2011-230651 describes an automatic tilting vehicle configured to judge a failure of a motor incorporated in an actuator and to suppress a tilt of the vehicle when a failure occurs in the motor. However, according to the configuration disclosed in this publication, even if an abnormality such as bending deformation occurs in a tie rod, the abnormality cannot be determined, such that a driver cannot recognize the abnormality of the tie rod.

SUMMARY

The present disclosure provides an automatic tilting vehicle equipped with a swing type vehicle tilting device in which, when an abnormality such as bending deformation of a tie rod occurs, it is determined that the vehicle tilting device is abnormal.

According to the present disclosure, there is provided an automatic tilting vehicle that includes a pair of laterally spaced wheels, a vehicle tilting device, and a control unit, wherein the pair of wheels are rotatably supported by corresponding carriers; the vehicle tilting device includes a swing member that swings about a swing axis extending in a longitudinal direction of the vehicle, an actuator that swings the swing member about the swing axis, and a pair of tie rods pivotally connected on both sides of the swing axis to the swing member and the corresponding carriers, wherein the control unit is configured to calculate a target tilt angle of the vehicle, and to tilt the vehicle by controlling the actuator such that a tilt angle of the vehicle conforms to the target tilt angle. It is to be noted that "lateral direction" and "longitudinal direction" are a lateral direction and a front-rear direction, respectively, of the vehicle and are orthogonal to each other.

The control unit is configured to determine that the vehicle tilting device is abnormal when a relationship between a swing angular velocity of the swing member and a tilt angular velocity of the vehicle deviates from a preset allowable range.

As will be described in detail later, when an abnormality such as bending deformation occurs in a tie rod, the effective length of the tie rod, that is, the distance between the connecting portion of the tie rod to the swing member and the connecting portion of the tie rod to the corresponding carrier is shorter than the distance when the tie rods are normal. Therefore, the conversion efficiency where a swing movement of the swing member is converted to a vertical movement of the corresponding wheel through the tie rod changes from the efficiency when the tie rods are normal, and, accordingly, the relationship between the swing angle of the swing member and the tilt angle of the vehicle is different from the relationship when the tie rods are normal. Consequently, the relationship between the swing angular velocity of the swing member and the tilt angular velocity of the vehicle is also different from the relationship when the tie rods are normal. Further, the degree of difference in these relationships increases as the degree of deformation of the tie rods increases, in other words, the degree of abnormality of the tie rods increases.

According to the above configuration, when the relationship between the swing angular velocity of the swing member and the tilt angular velocity of the vehicle deviates from a preset allowable range, it is determined that the vehicle tilting device is abnormal. Therefore, when an abnormality such as a bending deformation exceeding a reference value occurs in a tie rod and the relationship between the swing angular velocity of the swing member and the tilt angular velocity of the vehicle deviates from a preset allowable range, it can be determined that the vehicle tilting device is abnormal.

As described above, if an abnormality such as bending deformation occurs in a tie rod, the relationship between the swing angle of the swing member and the tilt angle of the vehicle becomes different from the relationship when the tie rods are normal. However, even though the tie rods are normal, when a road surface is cant (tilt in the lateral direction), the relationship between the swing angle of the swing member and the tilt angle of the vehicle is different from the relationship when the vehicle travels on a horizontal road. Therefore, if it is determined that the vehicle tilting device is abnormal when the relationship between the swing angle of the swing member and the tilt angle of the vehicle deviates from a preset allowable range, in a situation where there is a cant on a road surface, there is a possibility that the vehicle tilting device is erroneously determined as abnormal despite that the tie rods are in fact normal.

According to the above configuration, since an abnormality of the vehicle tilting device is determined based on the relationship between a swing angular velocity of the swing member and a tilt angular velocity of the vehicle, it is possible to prevent erroneous determination that the vehicle tilting device is abnormal due to a cant of a road surface despite that the tie rods are in fact normal.

According to one aspect of the present disclosure, the control unit is configured to determine a relationship between a swing angular velocity of the swing member and a tilt angular velocity of the vehicle based on an index value of a difference between the swing angular velocity of the swing member and the tilt angular velocity of the vehicle.

When an abnormality such as bending deformation occurs in a tie rod, an index value of a difference between the swing angular velocity of the swing member and the tilt angular velocity of the vehicle is different from the index value when the tie rods are normal. Further, a degree of difference in the index values of the differences increases as a degree of deformation of a tie rod increases, in other words, a degree of abnormality of the tie rod increases.

According to the above aspect, a relationship between a swing angular velocity of the swing member and a tilt angular velocity of the vehicle is determined based on an index value of a difference between the swing angular velocity of the swing member and the tilt angular velocity of the vehicle. Therefore, when an abnormality such as a bending deformation exceeding a reference value in a tie rod occurs and an index value of a difference between the swing angular velocity of the swing member and the tilt angular velocity of the vehicle deviates from a preset allowable range, it can be determined that the vehicle tilting device is abnormal.

It is to be noted that "an index value of a difference between a swing angular velocity of the swing member and a tilt angular velocity of the vehicle body" may be defined as "a difference between a value obtained by converting a swing angular velocity of the swing member into a tilt angular velocity of the vehicle body and a tilt angular velocity of the vehicle body" or "a difference between a swing angular velocity of the swing member and a value obtained by converting a tilting angular velocity of the vehicle body into a swing angular velocity of the swing member".

In another aspect of the present disclosure, the control unit is configured to determine a relationship between a swing angular velocity of the swing member and a tilt angular velocity of the vehicle based on an index value of a ratio between the swing angular velocity of the swing member and the tilt angular velocity of the vehicle.

When an abnormality such as bending deformation occurs in a tie rod, a relationship of a ratio between a swing angular velocity of the swing member and a tilt angular velocity of the vehicle is different from the relationship when the tie rods are normal. Furthermore, a degree of difference between the relationships of the ratios increases as a degree of deformation of the tie rod increases, in other words, a degree of abnormality of the tie rod increases.

According to the above aspect, a relationship between a swing angular velocity of the swing member and a tilt angular velocity of the vehicle is determined based on an index value of a ratio between the swing angular velocity of the swing member and the tilt angular velocity of the vehicle. Therefore, when an abnormality such as a bending deformation exceeding a reference value in a tie rod occurs and an index value of a ratio between a swing angular velocity of the swing member and a tilt angular velocity of the vehicle deviates from a preset allowable range, it can be determined that the vehicle tilting device is abnormal.

It is to be noted that "a ratio between a swing angular velocity of the swing member and a tilt angular velocity of the vehicle body" may be defined as a ratio of the tilt angular velocity of the vehicle body to a swing angular velocity of the swing member or a ratio of a swing angular velocity of the swing member to a tilt angular velocity of the vehicle body.

Furthermore, according to another aspect of the present disclosure, a tilt angular velocity of the vehicle is detected by a gyro sensor.

According to the above aspect, a tilt angular velocity of the vehicle is detected by a gyro sensor. Therefore, it is possible to eliminate the necessity of computing a tilt angular velocity of the vehicle by differentiating a detected tilt angle of the vehicle in such a case where a tilt angle of the vehicle is detected.

Other objects, other features and attendant advantages of the present disclosure will be readily understood from the description of the embodiments of the present disclosure described with reference to the following drawings.

DETAILED DESCRIPTION

Several embodiments of the present disclosure will be described in detail with reference to the attached drawings.

First Embodiment

Figure 1:
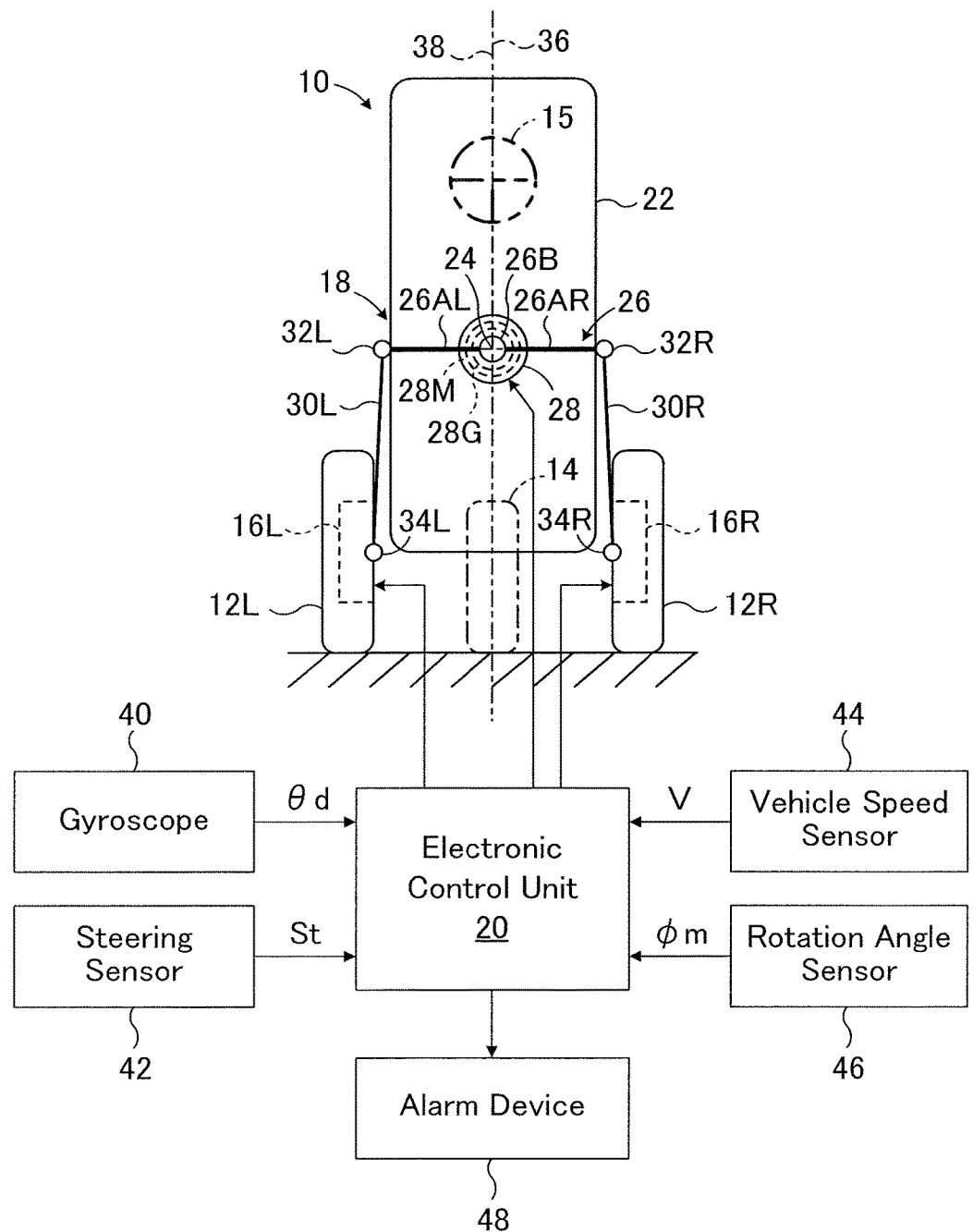
FIG. 1 is a schematic rear view showing a first embodiment of an automatic tilting vehicle according to the present disclosure, taken along a vertical section at a front wheel position.
Figure 2:
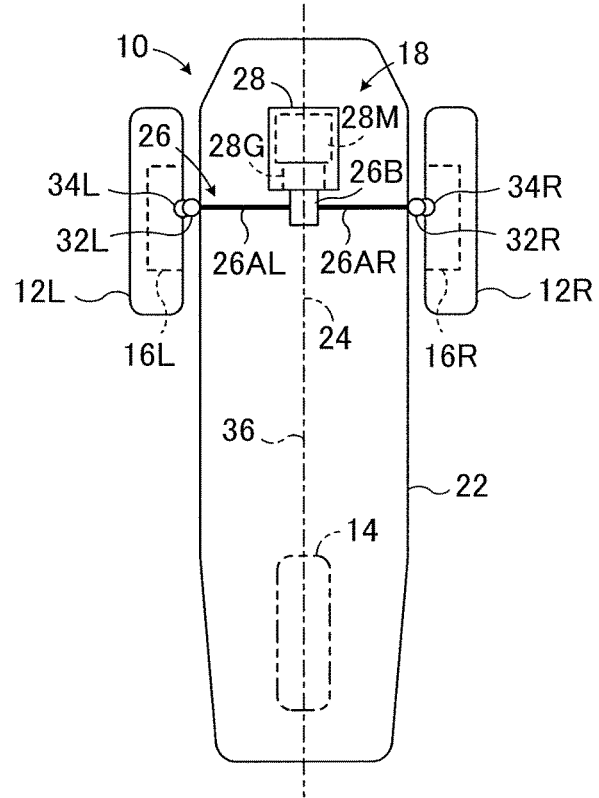
FIG. 2 is a schematic plan view showing the first embodiment of the automatic tilting vehicle according to the present disclosure.

In FIGS. 1 and 2, an automatic tilting vehicle 10 according to a first embodiment of the present disclosure is a three-wheeled vehicle that includes a pair of front wheels 12L and 12R which are non-steered driving wheels and a single rear wheel 14 which is a steering driven wheel. The front wheels 12L and 12R are spaced apart from each other in the lateral direction of the vehicle 10 and are rotatably supported by corresponding carriers 16L and 16R, respectively, about rotation axes (not shown). Although not shown in FIGS. 1 and 2, the rear wheel 14 is arranged to be steered by a steering mechanism according to an amount of operation of a steering wheel 15 by a driver. In FIGS. 1 and 3 and FIGS. 8 and 9 described later, the steering wheel 15 is shown in a position different from an actual position. The automatic tilting vehicle 10 further includes a vehicle tilting device 18 and an electronic control unit 20.

In the first embodiment, although not shown in FIGS. 1 and 2, the carriers 16L and 16R incorporate in-wheel motors as driving devices. The carriers 16L and 16R are supported so as to be vertically displaceable with respect to a vehicle body 22 by corresponding suspension arms such as leading arms and to restrict lateral displacement with respect to the vehicle body 22. The outputs of the in-wheel motors are controlled by the electronic control unit 20 according to an operation amount of an accelerator pedal (not shown) by the driver. Braking forces of the front wheels 12L, 12R and the rear wheel 14 are controlled by the electronic control unit 20 according to an amount of operation of a brake pedal (not shown) by the driver.

The vehicle tilting device 18 includes a swing member 26 that swings about a swing axis 24 extending in the longitudinal direction of the vehicle, an actuator 28 that swings the swing member 26 about the swing axis 24, and a pair of tie rods 30L and 30R. The tie rods 30L and 30R extend substantially in the vertical direction on both lateral sides with respect to the swing axis 24 and are pivotally connected to the swing member 26 by joints 32L and 32R such as ball joints at the upper ends. Further, the tie rods 30L and 30R are pivotally connected to the corresponding carriers 16L and 16R by joints 34L and 34R such as ball joints at the lower ends, respectively.

The swing member 26 has a boss portion 26B rotatably supported about the swing axis 24 and arm portions 26AL and 26AR integrally formed with the boss portion 26B and extending in opposite directions from the boss portion 26B. The upper ends of the tie rods 30L and 30R are pivotally connected to the distal ends of the arm portions 26AL and 26AR, respectively. Although not shown in FIGS. 1 and 2, a suspension spring and a shock absorber are interposed between the support member supporting the boss portion 26B and the actuator 28 and the vehicle body 22. The rear wheel 14 is suspended from the vehicle body 22 by a rear wheel suspension, not shown, including a suspension spring and a shock absorber. Therefore, the front wheels 12L, 12R and the rear wheel 14 can move upward and downward with respect to the vehicle body 22 together with the vehicle tilting device 18, and the relative vibration of them is attenuated by the shock absorber.

The actuator 28 is a rotary type actuator and includes an electric motor 28M and a reduction gear device 28G. Rotational motion of a rotor of the electric motor 28M is decelerated by the reduction gear device 28G and is transmitted to the swing member 26. Note that the actuator 28 may be a reciprocating type actuator, and reciprocating motion of the actuator may be converted into a rotational motion by a motion converting mechanism and transmitted to the swing member 26.

Figure 3:
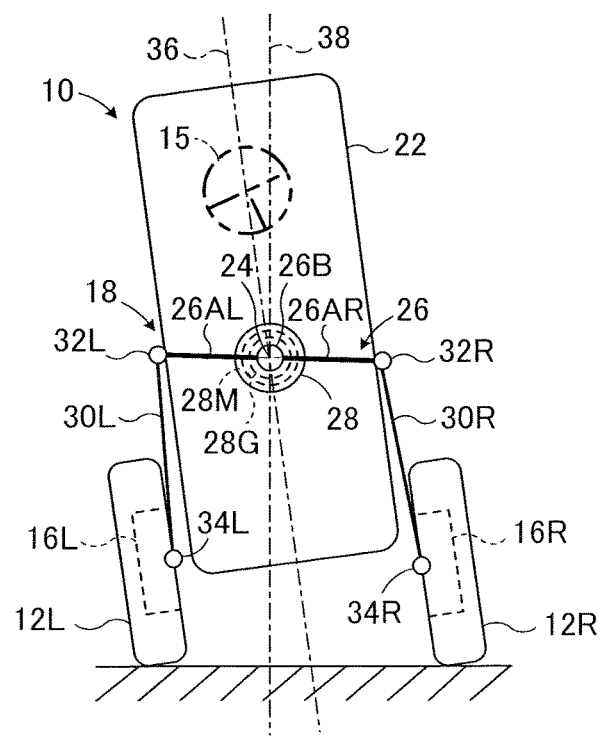
FIG. 3 is a rear view showing the first embodiment at the time of left turning, cut along a vertical section at a front wheel position.

As shown in FIG. 3, when the swing member 26 swings about the swing axis 24, the tie rods 30L and 30R vertically move in mutually opposite directions, so that the front wheels 12L and 12R vertically move in mutually opposite directions with respect to the vehicle body 22, whereby the vehicle 10 is inclined in the lateral direction. A rate of change of a tilt angle θ of the vehicle (an angle formed by a center plane 36 in the vertical direction of the vehicle 10 with respect to the vertical direction 38), that is, a tilt angular velocity θd of the vehicle is detected by a gyroscope 40. A signal indicating the tilt angular velocity θd of the vehicle detected by the gyroscope 40 is input to the electronic control unit 20.

The tilt angle θ becomes 0 when the swing angle of the swing member 26 is 0 and the center plane 36 coincides with the vertical direction 38 and assumes a positive value when the vehicle 10 is tilted so that the vehicle 10 is inclined to the left. The tilt angular velocity θd assumes a positive value when the tilt angle of the vehicle 10 changes to the left. Further, since the tilt angle θ of the vehicle 10 is substantially the same as a roll angle α, not shown, of the vehicle body 22, a roll angle α of the vehicle body may be detected by a roll angle sensor, and a tilt angular velocity θd may be calculated as a time change rate of the roll angle α.

A steering angle St equal to a rotation angle of the steering wheel 15 is detected by a steering angle sensor 42. A signal indicating a steering angle St detected by the steering angle sensor 42 and a signal indicating a vehicle speed V detected by a vehicle speed sensor 44 are input to the electronic control unit 20. A signal indicating a rotation angle φm of the electric motor 28M detected by a rotation angle sensor 46 is also input to the electronic control unit 20. The rotation angle φm becomes 0 when the swing angle of the swing member 26 is 0, and assumes a positive value when the swing member 26 swings so that the vehicle 10 is tilted to the left as viewed from the rear of the vehicle.

Figure 4:
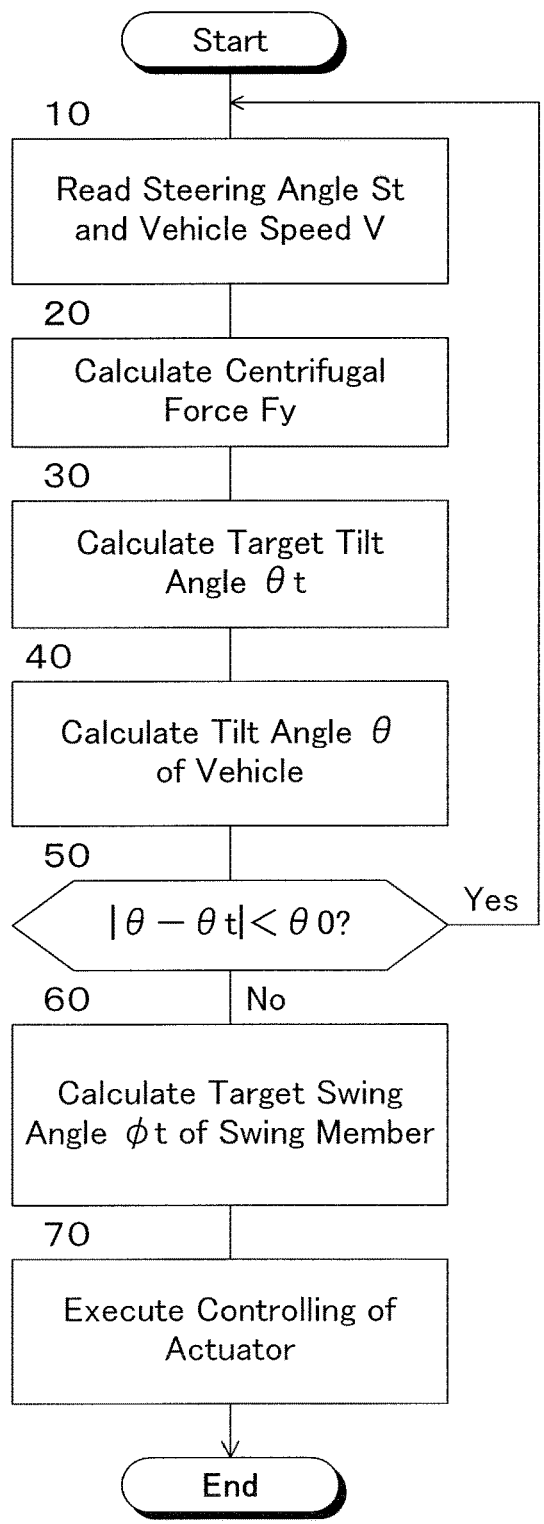
FIG. 4 is a flowchart showing a vehicle tilt angle control routine according to the first embodiment.

The electronic control unit 20 calculates a target tilt angle θt of the vehicle 10 in accordance with the flowchart shown in FIG. 4, and controls the rotation angle φm of the electric motor 28 M of the actuator 28 so that the tilt angle θ of the vehicle conforms to the target tilt angle θt. Therefore, the electronic control unit 20 functions as a control unit configured to tilt the vehicle 10 by controlling the swing angle φ of the swing member 26.

Figure 5:
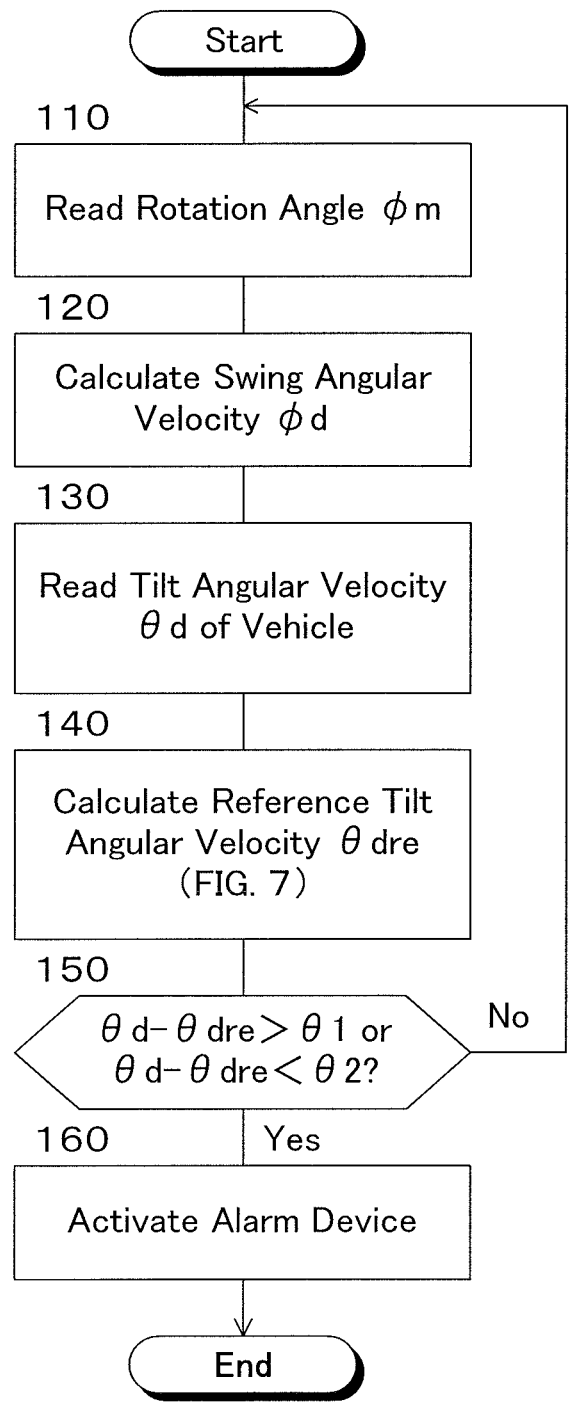
FIG. 5 is a flowchart showing an abnormality determination control routine of a vehicle tilting device in the first embodiment.

The electronic control unit 20, according to the flow chart shown in FIG. 5, obtains a swing angular velocity φd of the swing member 26 and a tilt angular velocity θd of the vehicle 10, and calculates a reference tilt angular velocity θdre as a tilt angular velocity θd of the vehicle 10 corresponding to a swing angular velocity φd when the vehicle tilting device 18 is normal. The reference tilt angular velocity θdre is a value obtained by converting the swing angular velocity φd of the swing member 26 into the tilt angular velocity of the vehicle 10. Further, when a difference θd−θdre between the tilt angular velocity θd and the reference tilt angular velocity θdre deviates from a preset allowable range, the electronic control unit 20 determines that the vehicle tilting device 18 is abnormal, and activates an alarm device 48.

In FIG. 1, the electronic control unit 20 and sensors such as the gyroscope 40 are shown outside the vehicle 10, but are mounted on the vehicle 10. The electronic control unit 20 may be a microcomputer having, for example, a CPU, a ROM, a RAM, and an input/output port device, which are connected to each other by a bi-directional common bus. The control programs corresponding to the flowcharts shown in FIGS. 4 and 5 are stored in the ROM, and the tilt angle θ and the like of the vehicle 10 are controlled by the CPU according to the control programs.

Next, the tilt angle control routine of the vehicle according to the first embodiment will be described with reference to the flowchart shown in FIG. 4. The control according to the flowchart shown in FIG. 4 is repeatedly executed at predetermined time intervals when an ignition switch, not shown, is on.

First, in step 10, a signal indicating a steering angle St detected by the steering angle sensor 42 and a signal indicating a vehicle speed V detected by the vehicle speed sensor 44 are read.

In step 20, an estimated lateral acceleration Gyh of the vehicle 10 is calculated on the basis of the steering angle St and the vehicle speed V in a manner known in the art, and furthermore, a centrifugal force Fy acting at the center of gravity, not shown, of the vehicle is calculated as a product of the estimated lateral acceleration Gyh and a mass M of the vehicle.

In step 30, a target tilt angle θt of the vehicle is calculated that is required to tilt the vehicle 10 toward a turning inner side so that a resultant force of the centrifugal force Fy and the gravity acting at the center of gravity of the vehicle 10 acts toward a line connecting a midpoint of ground contact points of the front wheels 12L and 12R and a ground contact point of the rear wheel 14.

In step 40, a signal indicating a tilt angular velocity θd of the vehicle 10 detected by the gyroscope 40 is read, and a tilt angle θ of the vehicle 10 is calculated by integrating the tilt angular velocity θd. When the gyroscope 40 outputs a signal indicating a tilt angle θ of the vehicle 10, an integration of a tilt angular velocity θd is unnecessary.

In step 50, it is determined whether an absolute value of a difference θ−θt between the tilt angle θ of the vehicle 10 and the target tilt angle θt of the vehicle is smaller than a reference value θ0 (a positive constant). When an affirmative determination is made, as it is not necessary to correct the tilt angle θ of the vehicle, the tilt angle control returns to step 10, and when a negative determination is made, the tilt angle control proceeds to step 60.

In step 60, a target swing angle φt of the swing member 26 is calculated that is necessary to render a difference θ−θt between the tilt angle θ of the vehicle 10 and the target tilt angle θt of the vehicle to 0, and a target rotation angle φmt of the electric motor 28 M of the actuator 28 is calculated that is necessary to achieve the target tilt angle φt.

In step 70, the electric motor 28M is controlled so that a rotation angle φm of the electric motor 28M conforms to the target rotation angle φmt, whereby the swing angle φ of the swing member 26 is controlled to the target swing angle φt.

As can be understood from the above description, in steps 10 to 30, a target tilt angle θt of the vehicle for tilting the vehicle 10 to a turning inner side is calculated, and in step 40, a tilt angle θ of the vehicle 10 is calculated based on a tilt angular velocity θd of the vehicle 10 detected by the gyroscope 40. Further, in steps 50 to 70, a swing angle φ of the swing member 26 is controlled so as to achieve the target swing angle φt by controlling the electric motor 28M of the actuator 28 so that a magnitude of a difference θ−θt between the tilt angle θ of the vehicle 10 and the target tilt angle θt is equal to or less than the reference value θ0.

Next, an abnormality determination control routine of the vehicle tilting device in the first embodiment will be described with reference to the flowchart shown in FIG. 5. The control according to the flowchart shown in FIG. 5 is also repeatedly executed at predetermined time intervals when the ignition switch, not shown, in the figure is on.

First, in step 110, a signal indicating a rotation angle φm of the electric motor 28M detected by the rotation angle sensor 46 is read.

In step 120, a swing angle φ of the swing member 26 is calculated based on the rotation angle φm of the electric motor 28M, and a swing angular velocity φd of the swing member 26 is calculated based on the swing angle φ and a swing angle φf of the previous cycle.

In step 130, a signal indicating the tilt angular velocity θd of the vehicle detected by the gyroscope 40 is read. When the gyroscope 40 outputs a signal indicating the tilt angle θ of the vehicle, a signal indicating the tilt angle θ of the vehicle is read, and a tilt angular velocity θd of the vehicle may be calculated based on the tilt angle θ of the vehicle and a tilt angle θf of the vehicle in the previous cycle.

Figure 7:
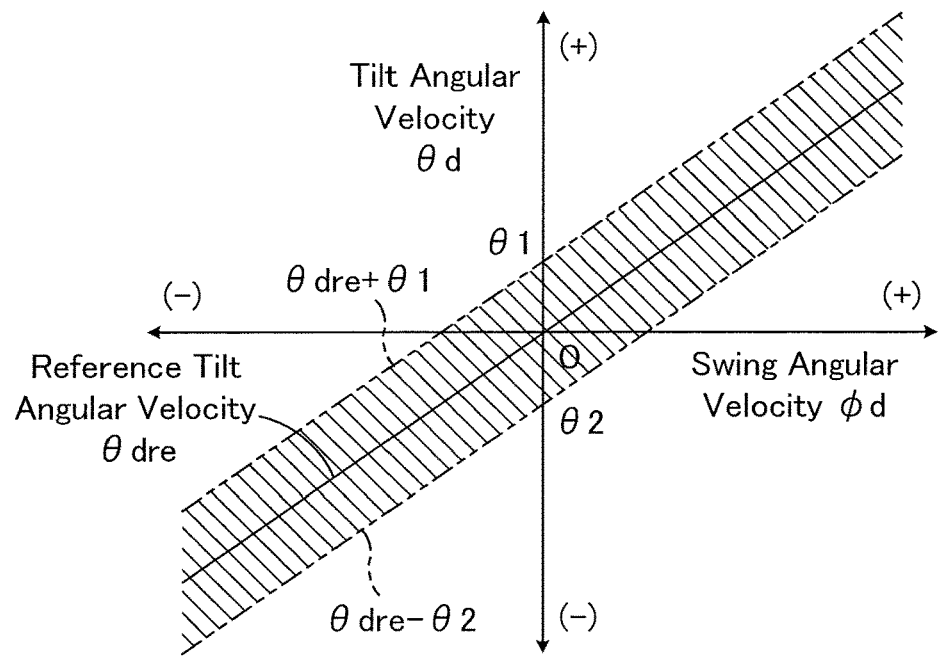
FIG. 7 is a diagram showing a map for calculating a reference tilt angular velocity θdre of the vehicle based on a swing angular velocity φd of a swing member and an allowable range in the abnormality determination of the vehicle tilting device in the first embodiment.

In step 140, a reference tilt angular velocity θdre of the vehicle 10 is calculated by referring to the map indicated by the solid line in FIG. 7 based on the swing angular velocity φd of the swing member 26.

In step 150, it is determined whether a difference θd−θdre between the tilt angular velocity θd and the reference tilt angular velocity θdre is greater than a preset first reference value θ1 (a positive constant) or smaller than a preset second reference value θ2 (a negative constant). The difference θd−θdre is an index value of a difference between a swing angular velocity φd of the swing member 26 and a tilt angular velocity θd of the vehicle. When a negative determination is made, as the vehicle tilting device 18 is normal, the abnormality determination control returns to step 110, and when an affirmative determination is made, as the vehicle tilting device 18 is abnormal, the abnormality determination control proceeds to step 160. It is to be noted that an absolute value of the second reference value θ2 and the first reference value θ1 may be the same or different from each other.

In step 160, it is determined that the vehicle tilting device 18 is abnormal, and the alarm device 48 is activated. The alarm issued by the alarm device 48 may be an alarm sound, an audible alarm such as an alarm message, an alarm lamp, a visual alarm such as an alarm indication to a monitor, a tactile warning such as a vibration of the steering wheel 15, or a combination thereof, for example.

As understood from the above description, in steps 110 and 120, a swing angular velocity φd of the swing member 26 is calculated, and in step 130, the tilt angular velocity θd of the vehicle is read. In step 140, a reference tilt angular velocity θdre of the vehicle 10 is calculated on the basis of the swing angular velocity φd, and in step 150, based on a difference θd−θdre between the tilt angular velocity θd and the reference tilt angular velocity θdre, it is determined whether or not the vehicle tilting device 18 is abnormal. Furthermore, when it is determined that the vehicle tilting device 18 is abnormal, in step 160, an alarm is issued to an occupant or occupants of the vehicle that the vehicle tilting device 18 is abnormal by activating the alarm device 48.

<Operation when the Vehicle Tilting Device 18 is Normal>

When the vehicle 10 turns to the left in a situation where the vehicle tilting device 18 is normal, as shown in FIG. 3, the swing member 26 is swung in the clockwise direction relative to the vehicle body 22 as viewed from the rear of the vehicle. Therefore, the left front wheel 12L is moved upward relative to the vehicle body 22 and the right front wheel 12R is moved downward relative to the vehicle body 22, whereby the vehicle 10 is tilted to the left as viewed from the rear of the vehicle. In the case where the vehicle 10 turns to the right, although not shown in the figure, the swing member 26 is swung in the counterclockwise direction relative to the vehicle body 22 as viewed from the rear of the vehicle, whereby the vehicle 10 is tilted to the right.

Even when the vehicle 10 turns in any direction, a target tilt angle θt of the vehicle is calculated based on a steering angle St and a vehicle speed V as described above. Further, a swing angle φ of the swing member 26 is controlled by controlling the electric motor 28 M of the actuator 28 so that a magnitude of a difference θ−θt between the tilt angle θ of the vehicle 10 and the target tilt angle θt is equal to or smaller than the reference value θ0. Therefore, it is possible to tilt the vehicle 10 toward inside of a turn so that a resultant force of the centrifugal force FY and gravity acting at the center of gravity of the vehicle 10 acts in a predetermined direction.

When the vehicle tilting device 18 is normal, the tilt angular velocity θd of the vehicle 10 changes in accordance with a change in a swing angular velocity φd of the swing member 26 along a straight line (that shows the reference tilt angular velocity θdre of the vehicle 10) shown by the solid line in FIG. 7. The swing angle φ of the swing member 26 is controlled so that a magnitude of the difference θ−θt is equal to or less than the reference value θ0 as described above. Therefore, if the amount of bending deformation of the tie rods 30L and 30R is within a predetermined allowable range, the tilt angular velocity θd of the vehicle 10 changes within an allowable range indicated by hatching in FIG. 7 with respect to a change of the swing angular velocity φd of the swing member 26.

<Operation when the Vehicle Tilting Device 18 is Abnormal>

Figure 8:
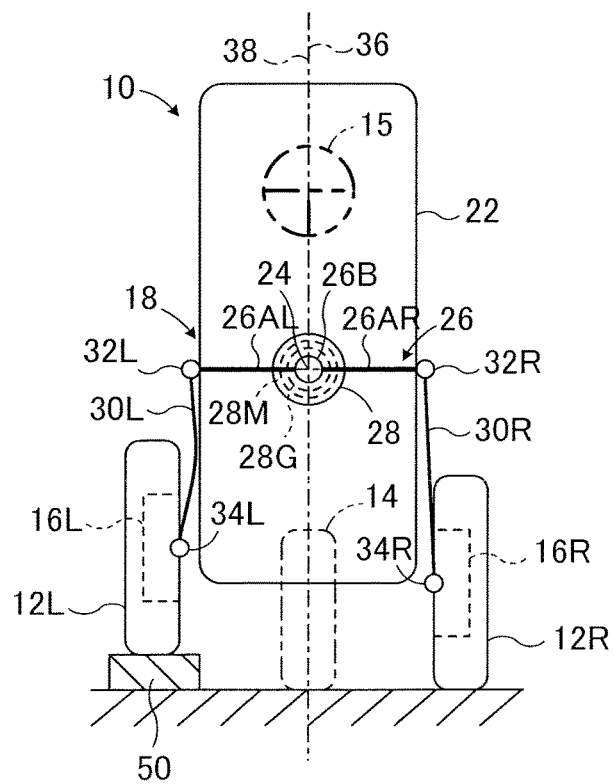
FIG. 8 is a view showing a state in which a left tie rod is bent and deformed by a left front wheel riding over a curb stone when the vehicle is traveling straight ahead with the vehicle tilting device being normal.

As shown in FIG. 8, it is assumed that the left front wheel 12L rides on a curb stone 50 when the vehicle 10 is traveling straight in a state where the vehicle tilting device 18 is normal, whereby a push-up load acts on the left front wheel 12L and the tie rod 30L is bent and deformed by buckling. Since the steering wheel 15 is in the straight traveling position and the swing angle φ of the swing member 26 is controlled to be 0, a distance between a pivot point of the joint 32L and a pivot point of the joint 34L becomes smaller than the distance when the tie rod 30L is normal.

Figure 9:
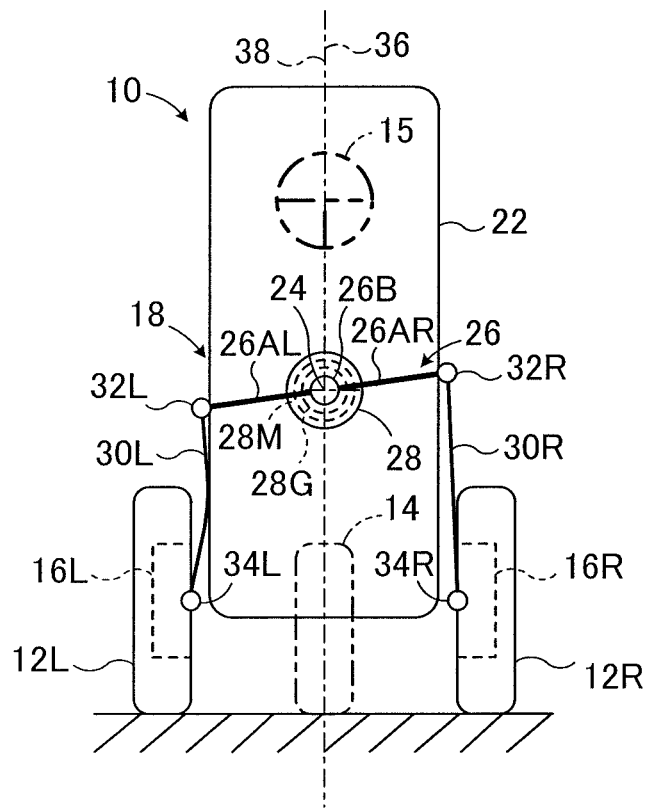
FIG. 9 is a view showing a situation in which the vehicle travels straight in a state where a left tie rod is bent and deformed.

As shown in FIG. 9, when the vehicle 10 travels straight in a state in which the tie rod 30L is bent and deformed, as the steering wheel 15 is in the straight traveling position, the swing member 26 is swung counterclockwise as viewed from the rear of the vehicle so that the vehicle 10 does not incline. Therefore, angles of line segments connecting the pivot points of the joints 32L and 32R and the pivot points of the joints 34L and 34R, respectively, to line segments connecting the swing axis 24 and the pivot points of the joints 32L and 32R are different from the angles when the tie rod 30L is normal. Furthermore, a radius of a locus drawn by the pivot point of the joint 34L when the pivot point rotates around the pivot point of the joint 32L as the swing member 26 swings is smaller than the radius when the tie rod 30L is normal.

Therefore, the efficiency with which the swing motion of the swing member 26 is converted into mutually opposite displacements of the front wheels 12L and 12R relative to the vehicle body 22 via the tie rods 30L and 30R is different from the efficiency when the tie rods 30L and 30R are normal. Therefore, the relationship between the swing angle φ of the swing member 26 and the tilt angle θ of the vehicle 10 is different from the relationship when the vehicle tilt device 18 is normal, and the relationship between the swing angular velocity φd of the swing member 26 and the tilt angular velocity θd of the vehicle 10 Is also different from the relationship when the vehicle tilt device 18 is normal. Further, a degree of difference between the above two respective relationships increases as a degree of deformation of the tie rods 30L or 30R increases.

When an amount of bending deformation of the tie rod 30L or 30R deviates from a preset allowable range, the tilt angular velocity θd of the vehicle 10 changes outside the allowable range shown by hatching in FIG. 7 in accordance with the change of the swing angular velocity φd of the swing member 26. Therefore, it can be determined whether or not the vehicle tilting device 18 is abnormal by determining whether or not the relationship between the swing angular velocity φd of the swing member 26 and the tilt angular velocity θd of the vehicle 10 is out of the allowable range indicated by hatching in FIG. 7.

According to the first embodiment, in step 140, a reference tilt angular velocity θdre of the vehicle 10 is calculated based on the swing angular velocity φd. In step 150, it is determined whether or not a difference θd−θdre between the tilt angular velocity θd and the reference tilt angular velocity θdre is greater than the preset first reference value θ1 or smaller than the preset second reference value θ2. When an affirmative determination is made, it is determined in step 160 that the vehicle tilting device 18 is abnormal, and the warning device 48 is activated.

Therefore, according to the first embodiment, when an abnormality such as bending deformation equal to or more than a preset reference value is generated in the tie rod 30L or 30R, it is determined that an index value of a difference between the swing angular velocity φd of the swing member 26 and the tilt angular velocity θd of the vehicle 10 deviates from a preset allowable range. Therefore, it can be determined that the vehicle tilting device 18 is abnormal, and the activation of the alarm device 48 allows an occupant or occupants of the vehicle to recognize that the vehicle tilting device 18 is abnormal.

In particular, according to the first embodiment, based on a difference θd−θdre between the tilt angular velocity θd and the reference tilt angular velocity $\theta dre$, and accordingly, based on an index value of a difference between the swing angular velocity $\varphi d$ and the tilt angular velocity $\theta d$, a determination is made as to whether or not the vehicle tilting device 18 is abnormal. Therefore, an erroneous determination can be avoided that may occur when the abnormality determination of the vehicle tilting device 18 is performed based on the relationship between the swing angle $\varphi$ and the tilt angle $\theta$. That is, it can be avoided that the vehicle tilting device 18 is determined to be abnormal due to a cant of a road surface despite that the vehicle tilting device 18 is in fact normal.

It is to be noted that representing a coefficient for converting the tilt angular velocity $\theta d$ of the vehicle 10 into the swing angular velocity $\varphi d$ of the swing member 26 as Ka, it may be determined whether or not the vehicle tilting device 18 is abnormal based on an index value of a difference $\varphi d - Ka\theta d$ or $Ka\theta d - \varphi d$ (a first modification example). Similarly, representing a coefficient for converting the swing angular velocity $\varphi d$ into the tilt angular velocity $\theta d$ of the vehicle 10 as Kb, it may be determined whether or not the vehicle tilting device 18 is abnormal based on an index value of a difference $Kb\varphi d - \theta d$ or $\theta d - Kb\varphi d$ (a second modification example).

Second Embodiment

Figure 6:
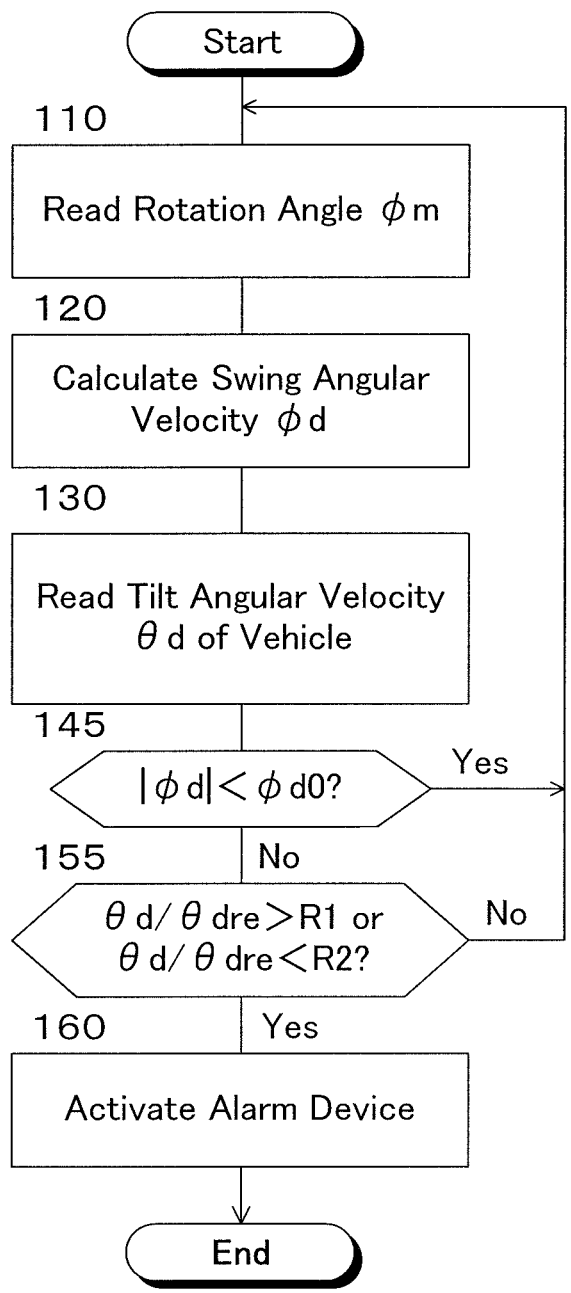
FIG. 6 is a flowchart showing an abnormality determination control routine of a vehicle tilting device according to a second embodiment.

FIG. 6 is a flowchart showing an abnormality determination control routine of the vehicle tilting device in the second embodiment of the automatic tilting vehicle 10 according to the present disclosure. In FIG. 6, the same step numbers as those shown in FIG. 5 are assigned to the same steps as those shown in FIG. 5.

The structure of the automatic tilting vehicle 10 according to the second embodiment is the same as that of the automatic tilting vehicle 10 according to the above-described first embodiment. However, in the ROM of the microcomputer of the electronic control unit 20, control programs corresponding to the flowcharts shown in FIGS. 4 and 6 are stored. The tilt angle control of the vehicle in the second embodiment is executed in accordance with the flowchart shown in FIG. 4 as in the first embodiment. Furthermore, as can be understood from the comparison between FIG. 6 and FIG. 5, the abnormality determination control of the vehicle tilting device in the second embodiment is the same as that of the first embodiment except that steps 145 and 155 are executed instead of steps 140 and 150.

In step 145, it is determined whether or not an absolute value of the swing angular velocity $\varphi d$ of the swing member 26 is less than a reference value $\varphi d0$ (a positive constant). When an affirmative determination is made, the abnormality determination control returns to step 110, and when a negative determination is made, the abnormality determination control proceeds to step 155.

In step 155, it is determined whether or not a ratio $\theta d/\varphi d$ of the tilt angular velocity $\theta d$ to the swing angular velocity $\varphi d$ is larger than a preset first reference value R1 (a positive constant) or smaller than a second reference value R2 (a positive constant smaller than R1). The ratio $\theta d/\varphi d$ is an index value of a ratio between the swing angular velocity $\varphi d$ of the swing member 26 and the tilt angular velocity $\theta d$ of the vehicle. When a negative determination is made, as the vehicle tilting device 18 is normal, the abnormality determination control returns to step 110, and when an affirmative determination is made, as the vehicle tilting device 18 is abnormal, the abnormality determination control proceeds to step 160.

Assuming the ratio of the tilt angular velocity $\theta d$ of the vehicle 10 to the swing angular velocity $\varphi d$ when the vehicle tilt device 18 is normal is R0 (a positive constant equal to $\theta dre/\theta d$), and $\Delta R1$ and $\Delta R2$ are positive constants, the reference values R1 and R2 may be $R0+\Delta R1$ and $R0-\Delta R2$, respectively. In this case, $\Delta R1$ and $\Delta R2$ may be different values or may be the same values.

As understood from the above description, in steps 110 and 120, a swing angular velocity $\varphi d$ of the swing member 26 is calculated, and in step 130, a tilt angular velocity $\theta d$ of the vehicle is read. In step 155, based on an index value $\theta d/\varphi d$ of a ratio between the swing angular velocity $\varphi d$ and the tilt angular velocity $\theta d$, it is determined whether or not the vehicle tilting device 18 is abnormal. Furthermore, when it is determined that the vehicle tilting device 18 is abnormal, an alarm is issued to an occupant or occupants of the vehicle that the vehicle tilting device 18 is abnormal by activating the alarm device 48 in step 160.

<Operation when the Vehicle Tilting Device 18 is Normal>

When the vehicle 10 turns in a situation where the vehicle tilting device 18 is normal, the swing member 26 is swung in the same manner as in the first embodiment, whereby the vehicle 10 is tilted inward in the turn.

When the vehicle 10 turns, a target tilt angle $\theta t$ of the vehicle is calculated based on a steering angle St and a vehicle speed V as in the first embodiment. Further, a swing angle $\varphi$ of the swing member 26 is controlled by controlling the electric motor 28M of the actuator 28 so that a ratio $\theta d/\varphi d$ between the tilt angle $\theta$ of the vehicle 10 and the target tilt angle $\theta t$ is not more than the first reference value R1 and not less than the second reference value R2. Therefore, it is possible to tilt the vehicle 10 toward the inside of the turn so that the resultant force of a centrifugal force Fy and the gravity acting at the center of gravity of the vehicle 10 acts in a predetermined direction.

Figure 10:
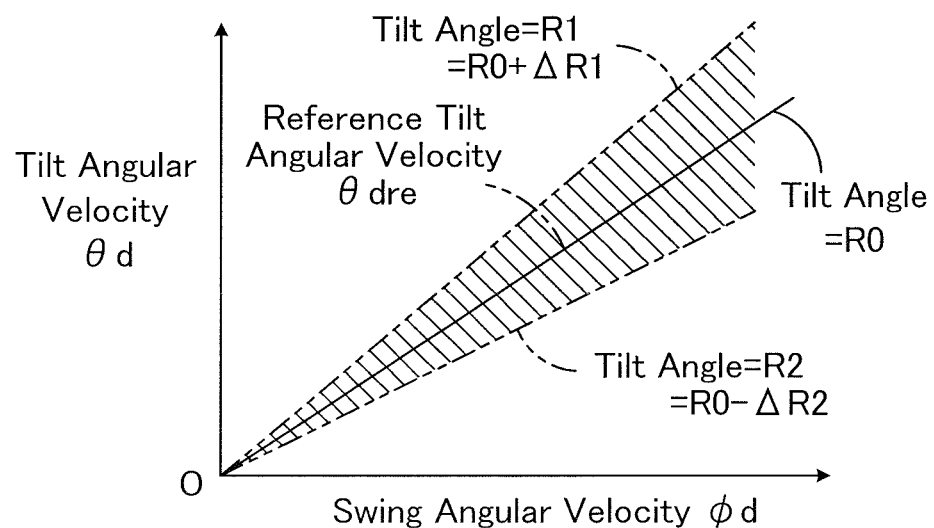
FIG. 10 is a diagram showing an allowable range in the abnormality determination of a vehicle tilting device in the second embodiment.

When the vehicle tilting device 18 is normal, the tilt angular velocity $\theta d$ of the vehicle 10 changes in accordance with a change in a swing angular velocity $\varphi d$ of the swing member 26 along a straight line (that shows the reference tilt angular velocity $\theta dre$ of the vehicle 10) shown by a solid line in FIG. 10. The swing angle $\varphi$ of the swing member 26 is controlled so that the ratio $\theta d/\varphi d$ is equal to or smaller than the first reference value R1 and equal to or larger than the second reference value R2 as described above. Therefore, if an amount of bending deformation of the tie rods 30L and 30R is within the preset allowable range, the tilt angular velocity $\theta d$ of the vehicle 10 changes within the allowable range that is indicated by hatching in FIG. 10 with respect to a change in the swing angular velocity $\varphi d$ of the swing member 26.

<Operation when the Vehicle Tilting Device 18 is Abnormal>

As described above, when the tie rod 30L or 30R undergoes bending deformation equal to or greater than the reference value, the relationship between the tilt angular velocity $\theta d$ of the vehicle 10 and the swing angular velocity $\varphi d$ of the swing member 26 is different from the relationship when the vehicle tilting device 18 is normal. Further, a degree of the difference between the relationships increases as a degree of deformation of the tie rods 30L or 30R increases.

When an amount of bending deformation of the tie rod 30L or 30R deviates from a preset allowable range, the tilt angular velocity $\theta d$ of the vehicle 10 changes outside the allowable range shown by hatching in FIG. 10 in accordance with a change in the swing angular velocity $\varphi d$ of the swing member 26. Therefore, it can be determined whether or not the vehicle tilting device 18 is abnormal by determining whether or not the relationship between the swing angular velocity φd of the swing member 26 and the tilt angular velocity θd of the vehicle 10 is out of the allowable range indicated by hatching in FIG. 10.

According to the second embodiment, in step 155, it is determined whether or not a ratio θd/φd of the tilt angular velocity θd to the swing angular velocity φd is larger than the preset first reference value R1 or smaller than the preset second reference value R2. When an affirmative determination is made, it is determined in step 160 that the vehicle tilting device 18 is abnormal, and the warning device 48 is activated.

Therefore, according to the second embodiment, when an abnormality such as a bending deformation equal to or more than a preset reference value is generated in the tie rod 30L or 30R, a ratio between the swing angular velocity φd of the swing member 26 and the tilt angular velocity θd of the vehicle 10 deviates from the preset allowable range. Therefore, it can be determined that the vehicle tilting device 18 is abnormal, and the activation of the alarm device 48 allows an occupant or occupants of the vehicle to recognize that the vehicle tilting device 18 is abnormal.

In particular, according to the second embodiment, it is determined whether or not the vehicle tilting device 18 is abnormal based on a ratio θd/φd of the tilt angular velocity θd to the swing angular velocity φd. Therefore, an erroneous determination can be avoided that may occur when the abnormality determination of the vehicle tilting device 18 is performed based on the relationship between the swing angle φ and the tilt angle θ. That is, it can be avoided that the vehicle tilting device 18 is determined to be abnormal due to a cant of a road surface despite that the vehicle tilting device 18 is in fact normal.

Further, according to the second embodiment, when an absolute value of the swing angular velocity φd of the swing member 26 is less than the reference value φd0, it is not determined whether or not the vehicle tilting device 18 is normal. Therefore, it is possible to prevent a ratio θd/φd from being calculated when the swing angular velocity φd of the swing member 26 is 0, and it is possible to prevent the vehicle tilting device 18 from being determined to be abnormal due to a detection error of the swing angular velocity φd and/or the tilt angle θ of the vehicle 10 despite that the vehicle tilting device 18 is in fact normal.

Furthermore, according to the second embodiment, the calculations of the reference tilt angular velocity θdre and the reference values R1 and R2 in the first embodiment are unnecessary, and the correction coefficient Ka or Kb in the first or second modification example is unnecessary to be calculated. Therefore, as compared to the first embodiment and the modifications thereof, a calculation load of the electronic control unit 20 can be reduced.

Although the present disclosure has been described in detail with reference to specific embodiments, it will be apparent to those skilled in the art that the present disclosure is not limited to the above-described embodiments, and various other embodiments are possible within the scope of the present disclosure.

For example, in the first embodiment described above, it is determined whether or not the vehicle tilting device 18 is abnormal based on a difference θd−θdre between the tilt angular velocity θd and the reference tilt angular velocity θdre. However, it may be determined whether or not the vehicle tilting device 18 is abnormal based on a difference θdre−θd between the reference tilt angular velocity θdre and the tilt angular velocity θd.

In the second embodiment described above, it is determined whether or not the vehicle tilting device 18 is abnormal based on a ratio θd/φd of the tilt angular velocity θd to the swing angular velocity φd. However, it may be determined whether or not the vehicle tilting device 18 is abnormal based on a ratio φd/θd of the swing angular velocity φd to the tilt angular velocity θd.

In addition, in the first and second embodiments, when an affirmative determination is made in steps 150 and 155, respectively, it is determined that the vehicle tilting device 18 is abnormal, and the warning device 48 is activated. However, it may be determined that the vehicle tilting device 18 is abnormal and the alarm device 48 is activated when the affirmative determination is made a predetermined number of times in steps 150 and 155.

In the first embodiment, the first reference value θ1 is a positive constant and the second reference value θ2 is a negative constant. However, at least one of the first reference value θ1 and the second reference value θ2 may be variably set according to the swing angular velocity φd.

Similarly, in the second embodiment, the first reference value R1 and the second reference value R2 are positive constants. However, at least one of the first reference value R1 and the second reference value R2 may be variably set according to the swing angular velocity φd.

In the first embodiment, it is determined whether or not the vehicle tilting device 18 is abnormal based on an index value of a difference between the tilt angular velocity θd and the swing angular velocity φd. However, it may be determined whether or not the vehicle tilting device 18 is abnormal based on an index value of a difference θdd−φdd or φdd−θdd between a change rate θdd of the tilt angular velocity θd and a change rate φdd of the swing angular velocity φd.

Similarly, in the second embodiment, it is determined whether or not the vehicle tilting device 18 is abnormal based on an index value θd/φd of a ratio of the swing angular velocity φd and the tilt angular velocity θd. However, it may be determined whether or not the tilting device 18 is abnormal based on a ratio θdd/φdd of a change rate θdd of the tilt angular velocity θd to a change rate φdd of the swing angular velocity φd or a ratio φdd/θdd of a change rate φdd of the swing angular velocity φd to a change rate φdd of the tilt angular velocity θd.

What is claimed is:

1. An automatic tilting vehicle comprising:
   a pair of laterally spaced wheels rotatably supported by corresponding carriers;
   a vehicle tilting device including:
      a swing member that swings about a swing axis extending in a longitudinal direction of the vehicle,
      an actuator that swings the swing member about the swing axis, and
      a pair of tie rods pivotally connected on both sides of the swing axis to the swing member and the carriers; and
   a control unit configured to:
      calculate a target tilt angle of the vehicle,
      tilt the vehicle by controlling the actuator such that a tilt angle of the vehicle conforms to the target tilt angle,
      determine a swing angular velocity of the swing member, which is a rate of change of an angle between the pair of tie rods and the swing member, and a tilt angular velocity of the vehicle, which is a rate of change of the tilt angle of the vehicle with respect to a vertical plane of the vehicle, and determine that the vehicle tilting device is abnormal when a ratio between the swing angular velocity of the swing member and the tilt angular velocity of the vehicle deviates from a preset allowable range.

2. The automatic tilting vehicle according to claim 1, wherein the control unit is configured to determine the ratio between the swing angular velocity of the swing member and the tilt angular velocity of the vehicle based on an index value of a difference between the swing angular velocity of the swing member and the tilt angular velocity of the vehicle.

3. The automatic tilting vehicle according to claim 1, wherein the control unit is configured to determine the ratio between the swing angular velocity of the swing member and the tilt angular velocity of the vehicle based on an index value of the ratio between the swing angular velocity of the swing member and the tilt angular velocity of the vehicle.

4. The automatic tilting vehicle according to claim 1, wherein the tilt angular velocity of the vehicle is detected by a gyro sensor.

\* \* \* \* \*